March 3, 1931. E. G. K. ANDERSON 1,794,505
CONNECTER BETWEEN CONDUITS OR CABLES AND OUTLET BOXES
Filed Aug. 30, 1929
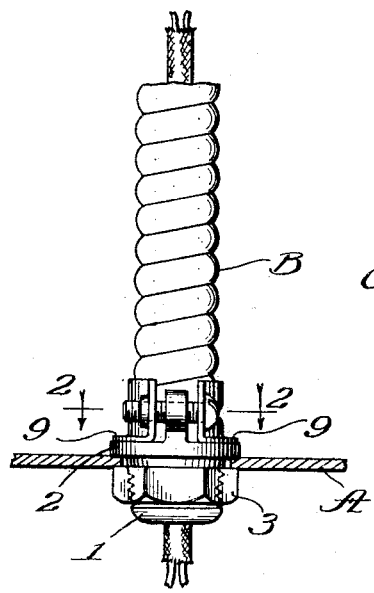
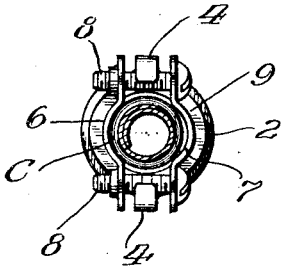
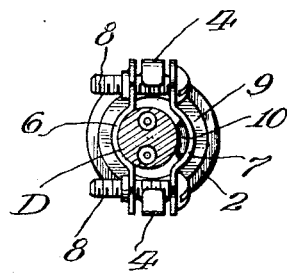
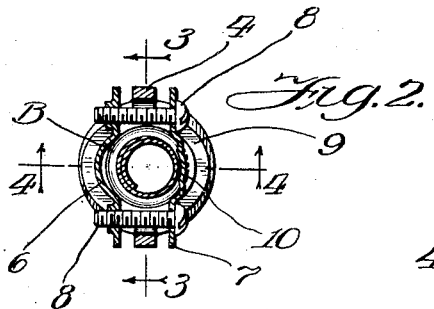
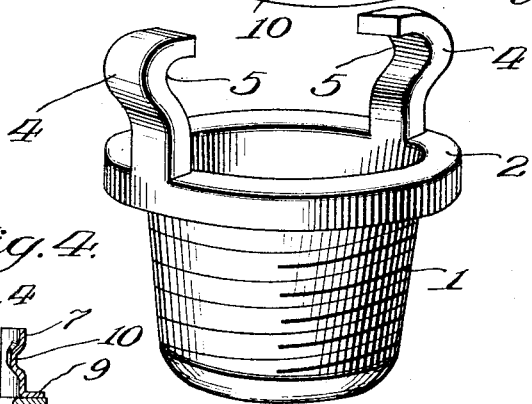
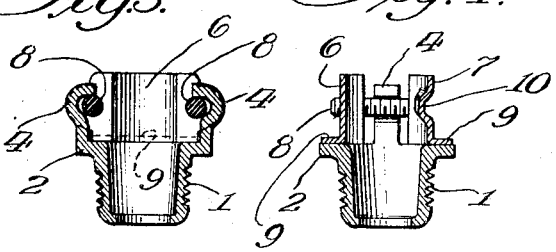
Inventor
E. G. K Anderson,
By Wm. F. Freudenreich,
Attys.

Patented Mar. 3, 1931

1,794,505

UNITED STATES PATENT OFFICE

ERNST G. K. ANDERSON, OF EVANSTON, ILLINOIS, ASSIGNOR TO APPLETON ELECTRIC COMPANY, A CORPORATION OF ILLINOIS

CONNECTER BETWEEN CONDUITS OR CABLES AND OUTLET BOXES

Application filed August 30, 1929. Serial No. 389,361.

The present invention has for its object to produce a simple and novel device by means of which conduits or cables may be firmly connected to an outlet box or the like; and particularly a device adapted to accommodate conduits or cables of various sizes.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is an elevation of a device constructed in accordance with the present invention applied to the wall of an outlet box, shown in section, and securing a metal conduit thereto; Fig. 2 is a section on line 2—2 of Fig. 1; Figs. 3 and 4 are sections taken respectively on line 3—3 and line 4—4 of Fig. 2; Fig. 5 is a perspective view, on an enlarged scale, illustrating the parts of the device separated from each other; Fig. 6 is an end view of the device, showing in section a conduit smaller than the one found in Fig. 1; and Fig. 7 is a view similar to Fig. 6, showing the device applied to a cable.

Referring to Figs. 1 to 5 of the drawing, 1 represents an externally-screwthreaded nipple having at one end an outwardly directed annular flange 2. As indicated in Fig. 1, the nipple is adapted to be inserted in an opening in a wall A of an outlet box or the like, which wall is gripped between the flange 2 and a nut 3 screwed upon the nipple. Projecting from the flange on opposite sides of the opening in the nipple, and extending in the direction of the length of the nipple, are two lugs 4, 4 undercut on the inner sides to provide concavities 5, 5. When the nipple is made of malleable metal the lugs may be simply long ears bent into hook shape.

Cooperating with the nipple are two similar clamping plates 6 and 7 long enough to span the space between the lugs. These plates are set on the flange of the nipple, on opposite sides of the lugs, and are connected together by suitable fastening elements that lie in the concavities in the lugs. Ordinarily the fastening elements will be in the form of screws, such as indicated at 8. The screws may pass freely through one of the plates and be screwthreaded into the other plate. It will be seen that when the parts are assembled the plates cannot accidentally be separated from the nipple. Each plate has on its inner end an outwardly directed flange 9. These flanges are wide enough to form closures for those portions of the opening in the nipple that may lie outwardly from the plates when the device is put into use.

The screws are preferably made sufficiently long to permit the plates to be spread apart far enough, without separating them from the nipple, to receive the element to be clamped to the wall or box.

In using the device, the nipple is attached to the wall as indicated in Fig. 1, the clamping plates being spread apart. Then, assuming that the member to be connected to the wall is a conduit, such as indicated at B, the end of the conduit is inserted between the clamping plates and the lugs and into the nipple. The screws are then tightened, closing the clamping plates upon the conduit and preventing the withdrawal of the latter from the nipple. The flanges 9 rest against the flanged outer end of the nipple and form covers for the marginal portions of the opening in the nipple.

Metal conduits are commonly made of spirally-wound strips producing on the exterior a helical or thread-like valley. In order that such a conduit may be most effectively gripped I provide one of the clamping plates with an indentation 10 that forms on the inner side a bead or projection that will fit into the valley on the exterior of the conduit.

In Fig. 6 I have shown the device applied to a conduit C smaller in diameter than the conduit B. It will be seen that the clamping plates in this instance are simply drawn together a little closer. In Fig. 7 the device is applied to a heavily insulated cable D which is smaller in diameter than the conduit C. It will be seen that the rib or bead 10 on the clamping plate bites slightly into the insulation on the cable and thereby prevents the withdrawal of the cable.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In a device of the character described, a member having an opening therein, a pair of undercut lugs projecting from said member on opposite sides of said opening, a pair of clamping elements lying on opposite sides of the lugs and spanning the space between them, and fastenings extending between said elements and spaced apart a distance sufficient to cause them to be in the concavities of said lugs.

2. In a device of the character described, a member having an opening therein, a pair of undercut lugs projecting from said member on opposite sides of said opening, a pair of clamping elements lying on opposite sides of the lugs and spanning the space between them, and fastenings extending between said elements and spaced apart a distance sufficient to cause them to be in the concavities of said lugs, said elements having flanges lying against said member and closing those portions of said opening lying outwardly therefrom.

3. In a device of the character described, a member having an opening therein, a pair of lugs projecting from said member on opposite sides of the opening and undercut on the sides toward the opening, a pair of oppositely-curved clamping plates lying on opposite sides of said lugs and spanning the space between them, and screws extending between corresponding ends of the plates and lying in the concavities of the lugs.

4. In a device of the character described, a member having an opening therein, a pair of lugs projecting from said member on opposite sides of the opening and undercut on the sides toward the opening, a pair of oppositely-curved clamping plates lying on opposite sides of said lugs and spanning the space between them, and screws extending between corresponding ends of the plates and lying in the concavities of the lugs, said plates being flanged laterally at their inner ends to form closures for those portions of the opening that may lie beyond the plates when in use.

5. In a device of the character described, a nipple having at one end lugs lying on apposite sides of the opening in the nipple and bent toward each other at their outer ends, clamping plates lying on opposite sides of the lugs and spanning the space between them, and screws extending between the plates behind the bent outer ends of the lugs.

6. In a device of the character described, a nipple having at one end lugs lying on opposite sides of the opening in the nipple, the lugs being undercut on the sides facing the said opening, oppositely-bowed clamping plates lying on the opposite sides of the lugs, and a pair of fastenings between said plates each lying in the concavity of one of the lugs.

7. In a device of the character described, a nipple having at one end lugs lying on opposite sides of the opening in the nipple, the lugs being undercut on the sides facing the said opening, oppositely-bowed clamping plates lying on opposite sides of the lugs, a pair of fastenings between said plates each lying in the concavity of one of the lugs, and flanges on the plates extending outwardly therefrom and resting against the end of the nipple.

8. In a device of the character described an externally-screwthreaded nipple adapted to extend through an opening in the wall of an outlet box and having at one end a flange to engage with such wall, longitudinally-extending lugs projecting from the flange on opposite sides of the opening in the nipple, the lugs being undercut on the inner sides, a pair of clamps disposed on opposite sides of the lugs and spanning the space between them, and screws connecting the plates together, the screws being so spaced that they lie in the concavities of the lugs.

In testimony whereof, I sign this specification.

ERNST G. K. ANDERSON.